US012301156B2

(12) United States Patent
D'Angelo (10) Patent No.: US 12,301,156 B2
(45) Date of Patent: May 13, 2025

(54) METHOD FOR CONTROLLING A BLDC MOTOR AND CORRESPONDING CONTROL CIRCUIT

(71) Applicant: STMicroelectronics S.r.l., Agrate Brianza (IT)

(72) Inventor: Giuseppe D'Angelo, Tufino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 139 days.

(21) Appl. No.: 18/299,300

(22) Filed: Apr. 12, 2023

(65) Prior Publication Data
US 2023/0353071 A1 Nov. 2, 2023

(30) Foreign Application Priority Data

Apr. 29, 2022 (IT) .......................... 102022000008666

(51) Int. Cl.
 *H02P 6/182* (2016.01)
(52) U.S. Cl.
 CPC .................................. *H02P 6/182* (2013.01)
(58) Field of Classification Search
 CPC ...... H02P 6/08; H02P 6/10; H02P 6/12; H02P 6/14; H02P 6/15; H02P 6/157; H02P 6/16; H02P 6/18; H02P 6/182; H02P 6/28; H02P 7/29; H02P 21/00; H02P 21/0003; H02P 21/18; H02P 21/22; H02P 23/00; H02P 6/085; H02P 2209/11; H02P 27/08; Y10S 388/9072; Y10S 388/901
 See application file for complete search history.

(56) References Cited

U.S. PATENT DOCUMENTS

| | | | |
|---|---|---|---|
| 7,034,478 B2 | 4/2006 | Bhaumik et al. | |
| 2005/0275361 A1 | 12/2005 | Bolt | |
| 2006/0066280 A1 | 3/2006 | Bhaumik et al. | |
| 2017/0346420 A1* | 11/2017 | Ross | H02P 6/182 |

FOREIGN PATENT DOCUMENTS

| | | |
|---|---|---|
| CN | 204101628 U | 1/2015 |
| KR | 20090049855 A | 5/2009 |

OTHER PUBLICATIONS

Shao, Jianwen, "An Improved Microcontroller-Based Sensorless Brushless DC (BLDC) Motor Drive for Automotive Applications", IEEE Transactions on Industry Applications, vol. 42, No. 5, Sep./Oct. 2006, pp. 1216-1221.

* cited by examiner

*Primary Examiner* — Antony M Paul
(74) *Attorney, Agent, or Firm* — Slater Matsil, LLP (57) ABSTRACT

A method for controlling a BLDC motor includes controlling the rotational speed or position of the BLDC motor based on a position of the rotor of the motor. The BLDC motor is driven by a three-phase inverter. A PWM signal is generated for three PWM phases, each including a pair of complementary signals with dead-time and having a duty cycle based on the current position of the rotor. The complementary signals are supplied to a respective high side and low side switch of each of three arms of the three-phase inverter, and a zero-crossing time measurement is performed on each of the back electromotive forces. Corresponding signals are obtained indicating the zero-crossing times. Trigger signals are generated, and the occurrence of a time interval corresponding to the dead time in the respective PWM phase is identified. The zero-crossing time measurement is performed during the occurrence of the dead-time.

20 Claims, 4 Drawing Sheets

METHOD FOR CONTROLLING A BLDC MOTOR AND CORRESPONDING CONTROL CIRCUIT

CROSS-REFERENCE TO RELATED APPLICATIONS

This application claims priority to Italian Application No. 102022000008666, filed on Apr. 29, 2022, which application is hereby incorporated herein by reference.

TECHNICAL FIELD

The present disclosure relates generally to techniques for controlling a brushless DC (BLDC) motor.

BACKGROUND

In recent years, the brushless DC (BLDC) motor is receiving increasing interest for automotive applications. This is due to the higher reliability/longevity, lower maintenance, and quieter operation that BLDC has compared to its brushed DC counterpart. Over the last decade, continuing improvements in power semiconductors and controller integrated circuits as well as the permanent-magnet brushless motor production have made it possible to manufacture reliable cost-effective solutions for a broad range of adjustable speed applications. BLDC motors are being designed in or currently used in power steering, engine cooling fan, fuel/water pump, air-conditioning compressor, and heating, ventilating, and air-conditioning (HVAC) blower motors.

The BLDC motors are electronically commutated motors having a linear relationship between current/voltage and torque/speed. Generally, BLDC motors are driven by three-phase inverter using a six-step commutation method for low-end application. The commutation phase sequence is AB-AC-BC-BA-CA-CB and the conducting interval for each phase is 120 electrical degrees. According to this, only two phases conduct current at any time, leaving the third phase floating. To produce maximum torque, the three-phase inverter is commutated every 60 electrical degrees so that each motor phase current is in phase with the back-electromotive force (or back-EMF). The commutation timing is determined by the rotor position, which can be determined every 60 electrical degrees by detecting zero crossing of back-EMF on the floating phase of the motor. Such a solution is described for instance in the publication of J. Shao "An Improved Microcontroller-Based Sensorless Brushless DC (BLDG) Motor Drive for Automotive Applications". 2006, IEEE Transactions on Industry Applications, VOL. 42, NO. 5. However, this method presents some drawbacks as higher torque ripple on each commutation, reduced maximum torque, higher acoustic and electric noise.

Sinusoidal commutation may overcome these drawbacks. The basic principle of sinusoidal commutation is to provide sinusoidal current which varies according to the rotor position. The phase currents have a sinusoidal shape, and they are phase shifted by 120 electrical degrees. Sinusoidal commutation is achieved by using the Space Vector Modulation technique. Using this technique, all three phases of the BLDC motor are simultaneously driven and in general the back-EMF cannot be measured. One possible solution is to predict an approximate location of the back-EMF zero crossing on at least one of the three phases and stop driving on the selected phase long enough to detect the expected zero crossing, i.e. opening a time window for the back-EMF detection. Such a solution is described for instance in the U.S. Pat. No. 7,034,478 B2. The time window (start and duration) is selected as a function of the last measured electrical period and the rotational position of the motor. However, this method presents some drawbacks as higher computational load, the torque ripple and the electric noise.

SUMMARY

The present disclosure relates generally to techniques for controlling a brushless DC (BLDC) motor, and particular embodiments relate to such techniques including controlling the rotational speed and/or position of the BLDC motor on the basis of a position of the rotor of the motor, with the position of the rotor being computed by sensing the back electromotive force. The BLDC motor may be driven with three driving phases supplied to three-phase driving terminals by a three-phase inverter that includes three arms, each having a high side and a low side switch, operating with a sinusoidal commutation.

One or more embodiments of the present disclosure relate in particular to the field of power steering, engine cooling fan, fuel/water pump, air-conditioning compressor.

On the basis of the foregoing description, the need or desire is felt for solutions which overcome one or more of the previously outlined drawbacks.

According to one or more embodiments, such drawbacks may be at least partially overcome and technical benefits may be achieved through a method as described herein. Embodiments moreover are directed to a related control circuit.

The claims are an integral part of the technical teaching of the disclosure provided herein.

In at least one embodiment, a method is provided that includes: controlling at least one of a rotational speed or position of a brushless DC (BLDC) motor based on a position of a rotor of the BLDC motor, the BLDC motor being driven with three driving phases supplied to three-phase driving terminals by a three-phase inverter having three arms, each of the arms respectively including a high side switch and a low side switch, the BLDC motor configured to operate with a sinusoidal commutation, the controlling the at least one of the rotational speed or the position of the BLDC motor including calculating a current position of the rotor based on zero-crossing times of back electromotive forces, by: generating a respective pulse width modulation (PWM) signal for each of three PWM phases, each of the PWM signals including a respective pair of complementary signals with dead-time and having a duty cycle based on the current position of the rotor; supplying each pair of complementary signals with dead-time to a respective high side switch and low side switch of the three-phase inverter; sensing back electromotive forces at the three-phase driving terminals of the BLDC motor and obtaining corresponding signals indicating zero-crossing times by performing a zero-crossing time measurement on each of the back electromotive forces and obtaining corresponding signals indicating the zero-crossing times; generating trigger signals, which activate the performing the zero-crossing time measurement on each of said back electromotive forces; and identifying the occurrence of a time interval corresponding to a dead time in the respective PWM phase, wherein the zero-crossing time measurement is performed during the occurrence of the dead-time.

In one or more embodiments, the identifying the occurrence of a time interval corresponding to the dead time in the respective PWM phase includes calculating the time interval corresponding to the dead time based on current values of period, duty cycle and dead time in the respective PWM phase, and the computing trigger signals, which activate the performing the zero-crossing time measurement is based on a zero-crossing measurement time to perform a measurement of a back electromotive force value, the zero-crossing measurement time being lower than the dead-time.

In some embodiments, the zero-crossing measurement time includes at least a sampling time of the back electromotive force.

In some embodiments, the zero-crossing time measurement includes comparing the back electromotive forces with respective programmable thresholds signaling as zero-crossing time values, and issuing a pulse signal in response to one of the back electromotive forces crossing a respective threshold.

In some embodiments, the trigger signal for a respective phase is equal to at least one of: an off time of the complementary signal supplied to the high switch minus the back-electromotive force sampling time, an on time of the complementary signal supplied to the low switch plus the dead-time minus the back-electromotive force sampling time, a PWM period minus the off time of the complementary signal supplied to the high switch plus the dead-time minus the back-electromotive force sampling time, or the PWM period minus the on time of the complementary signal supplied to low switch minus the back-electromotive force sampling time.

In some embodiments, the sensing back-electromotive forces at the three-phase driving terminals of the BLDC motor includes at least one of conditioning the back-electromotive forces in a given voltage range or filtering the back-electromotive forces to remove overlapped noise.

In some embodiments, the calculating the current position of the rotor based on zero-crossing times of back electromotive forces includes determining the current rotor position of the rotor based on a last measured electrical period and a time location of a last detected zero crossing.

In some embodiments, the zero-crossing time measurement includes comparing the back electromotive forces with respective programmable thresholds signaling as zero-crossing time values, and issuing a pulse signal in response to one of the back electromotive forces crossing a respective threshold, and the time location of the last detected zero crossing is indicated by the pulse signal.

In at least one embodiment, a control circuit of a brushless DC (BLDC) motor is provided that is configured to control the BLDC motor based on a position of a rotor of the BLDC motor. The BLDC motor is driven with three driving phases supplied to three-phase driving terminals by a three-phase inverter having three arms, each of the arms respectively including a high side switch and a low side switch. The BLDC motor is configured to operate with a sinusoidal commutation. The control circuit includes processing circuitry configured to calculate a current position of the rotor based on zero-crossing times of back electromotive forces. The processing circuitry includes: PWM generation circuitry configured to generate a PWM signal for each of three PWM phases, each of the PWM signals including a respective pair of complementary signals with dead-time and having a duty cycle based on a current position of the rotor, and to drive the three-phase inverter by supplying each pair of complementary signals with dead-time to a respective high side switch and low side switch; measurement circuitry configured to generate corresponding signals indicating zero-crossing times by performing a zero-crossing time measurement on each of the back electromotive forces sensed at the three-phase driving terminals of the BLDC motor the current position of the rotor being calculated based on the zero-crossing times of the back electromotive forces; and trigger circuitry configured to generate trigger signals based on the occurrence of a time interval corresponding to the dead time in the respective PWM phase, which activate the measurement circuitry to perform the zero-crossing time measurement on each of the back electromotive forces. The zero-crossing time measurement during is performed during the occurrence of the dead-time.

In some embodiments, the trigger circuitry is configured to generate the trigger signals based on current values of period, duty cycle, and dead time in the respective PWM phase, and based on a zero-crossing measurement time to perform a measurement of a back electromotive force value. The zero-crossing measurement time is lower than the dead-time.

In some embodiments, the zero-crossing measurement time includes at least a sampling time of the back electromotive force.

In some embodiments, the measurement circuitry includes comparator circuits configured to compare the back electromotive forces with respective programmable thresholds signaling as zero-crossing time values, and issue a pulse signal in response to one of the back electromotive forces crossing a respective threshold.

In some embodiments, the trigger signal for a respective phase is equal to at least one of: an off time of the complementary signal supplied to the high switch minus the back-electromotive force sampling time, an on time of the complementary signal supplied to the low switch plus the dead-time minus the back-electromotive force sampling time, a PWM period minus the off time of the complementary signal supplied to the high switch plus the dead-time minus the back-electromotive force sampling time, or the PWM period minus the on time of the complementary signal supplied to low switch minus the back-electromotive force sampling time.

In some embodiments, the control circuit includes conditioning circuits configured to condition the back-electromotive forces in a given voltage range.

In some embodiments, the control circuit includes conditioning circuits configured to filter the back-electromotive forces to remove overlapped noise.

In some embodiments, the processing circuitry is configured to determine the current position of the rotor based on a last measured electrical period and a time location of a last detected zero crossing.

In some embodiments, the processing circuitry is configured to determine the current position of the rotor based on a pulse signal issued by the measurement circuitry.

In at least one embodiment, a device is provided that includes: a brushless DC (BLDC) motor configured to be driven with three driving phases supplied to three-phase driving terminals by a three-phase inverter having three arms, each of the arms respectively including a high side switch and a low side switch, the BLDC motor configured to operate with a sinusoidal commutation; and a control circuit. The control circuit is configured to: control the BLDC motor based on a position of a rotor of the BLDC motor; calculate a current position of the rotor based on zero-crossing times of back electromotive forces; generate a PWM signal for each of three PWM phases, each of the PWM signals including a respective pair of complementary signals with dead-time and having a duty cycle based on a current position of the rotor, and to drive the three-phase inverter by supplying each pair of complementary signals with dead-time to a respective high side switch and low side switch; generate corresponding signals indicating zero-crossing times by performing a zero-crossing time measurement on each of the back electromotive forces sensed at the three-phase driving terminals of the BLDC motor, the current position of the rotor being calculated based on the zero-crossing times of the back electromotive forces; and generate trigger signals based on the occurrence of a time interval corresponding to the dead time in the respective PWM phase, which activate the measurement circuitry to perform the zero-crossing time measurement on each of the back electromotive forces, wherein the zero-crossing time measurement during is performed during the occurrence of the dead-time.

In some embodiments, the control circuitry is configured to generate the trigger signals based on current values of period, duty cycle, and dead time in the respective PWM phase, and based on a zero-crossing measurement time to perform a measurement of a back electromotive force value, the zero-crossing measurement time being lower than the dead-time.

In some embodiments, the zero-crossing measurement time includes at least a sampling time of the back electromotive force.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to previous figures are denoted by the same references previously used in such figures; the description of such previously described elements will not be repeated in the following in order not to overburden the present detailed description.

The solution here described, for example, as provided with respect to one or more embodiments, refers to a method for controlling a BLDC motor which senses or detect the back-EMF zero crossing for sinusoidal commutation without the need to open a dedicated time window, e.g., without the need to stop driving of a motor phase.

Figure 1:
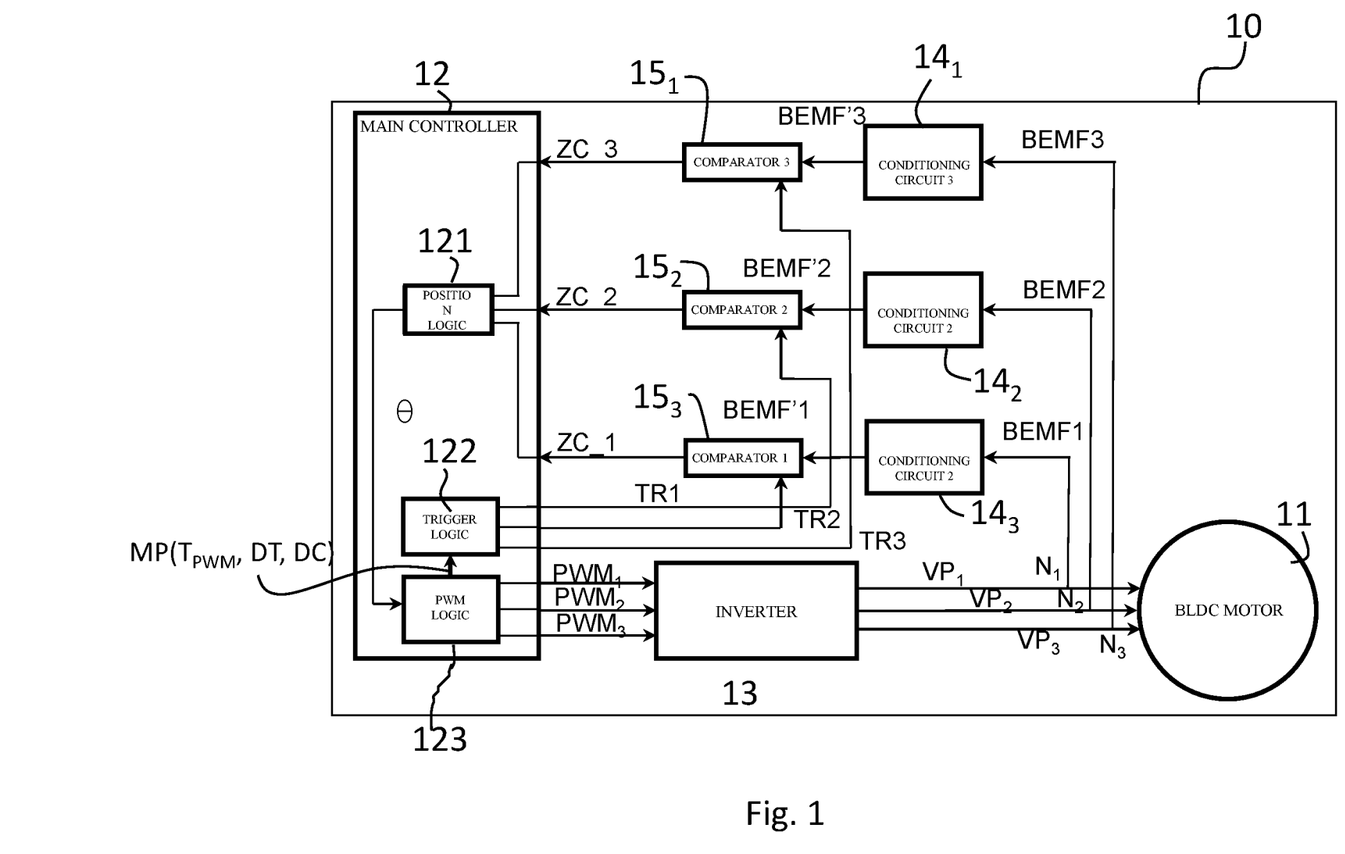
FIG. 1 represents schematically a control circuit according to embodiments.

In this regard, FIG. 1 shows schematically a control circuit implementing of the proposed solution, in accordance with one or more embodiments.

With the numerical reference 10 is indicated a BLDC motor controlling circuit which controls a BLDC motor 11. The controlling circuit 10 comprises a main controller 12, e.g., a processing arrangement or processing circuitry, which is for instance embodied by a microprocessor or a microcontroller, and comprises circuitry (e.g., logic or software circuitry, which may be referred to herein as "modules") such as a position logic circuitry or module 121, a trigger circuitry or logic 122 and a PWM (Pulse Width Modulation) circuitry or logic 123. The PWM logic 123 is configured to issue a triad or triplet of PWM phases, $PWM_1$, $PWM_2$, $PWM_3$ to an inverter 13 which issues driving phases $VP_1$, $VP_2$, $VP_3$, in particular voltage signals, to the respective nodes $N_1$, $N_2$, $N_3$ which are the coupled to the motor 11 windings to drive such motor 11. Each phase $PWM_i$, where i=1, 2, 3 is an index indicating the phase of the three-phases system, comprises two complementary signals, $TH_i$ and $TL_i$, with a deadtime DT, i.e., signals $TH_i$ and $TL_i$ are Pulse Width Modulation signals with a given PWM period $T_{PWM}$ and duty cycle DC, assuming complementary values, i.e. one the negated of the other, except for an interval, the dead time DT, between the transition of the signal and the transition of the other, in order to take in account the finite time to change states, preventing a short circuit developing across supply $V_{DC}$ and ground GND.

Back electromotive forces $BEMF_1$, $BEMF_2$, $BEMF_3$ are sensed at nodes $N_1$, $N_2$, $N_3$ and supplied as inputs to respective conditioning circuits $14_1$, $14_2$, $14_3$, which are configured to output respective conditioned back electromotive forces $BEMF'_1$, $BEMF'_2$, $BEMF'_3$ to the input of respective measurement circuitry, which in some embodiments may be comparators $15_1$, $15_2$, $15_3$, which output respective zero crossing signals $ZC_1$, $ZC_2$, $ZC_3$ to the position logic 121, which sends to the PWM logic 123 a current rotor position information θ on the basis of the current zero crossing signals $ZC_1$, $ZC_2$, $ZC_3$. The trigger logic 122, under the control of the PWM logic 123 issues a triad of trigger signals $TR_1$, $TR_2$, $TR_3$, which controls the operation of comparators $15_1$, $15_2$, $15_3$, in particular the activation of their comparison operation.

Figure 2:
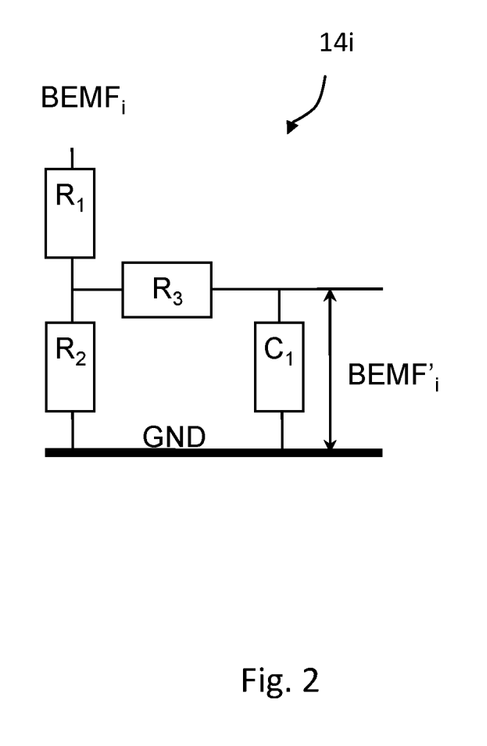
FIG. 2 represents schematically a first sub-circuit of the control circuit according to embodiments.

The back-EMF signals $BEMF_1$, $BEMF_2$, $BEMF_3$ may be brought directly to comparators $15_1$, $15_2$, $15_3$ or, as in the example shown in FIG. 1, they may be conditioned in order to reduce the signal in the correct voltage range and they can be filtered in order to remove overlapped noise, for instance using the conditioning circuit $14_i$ (i=1, 2, 3) shown in FIG. 2. There back-EMF signals $BEMF_1$, $BEMF_2$, $BEMF_3$ acquired from nodes $N_1$, $N_2$, $N_3$ are sent as input to a conditioning circuit 14i comprising an input series resistor $R_1$ which forms a divider with a resistor $R_2$ coupled to ground GND. The central node of the divider is the input of a RC filter comprising a series filter resistor $R_3$ followed by a parallel filter capacitor $C_1$, across which is taken the corresponding conditioned back-EMF signal $BEMF'_i$. The conditioning circuit 14i may comprise only the divider or only the filter, i.e., the conditioned back-EMF signal $BEMF'_1$ may be only resealed in a given voltage range or only filtered.

Figure 3:
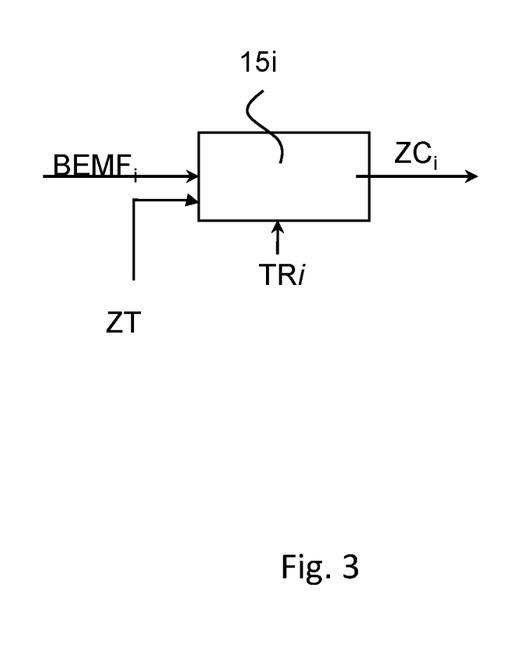
FIG. 3 represents schematically a second sub-circuit of the control circuit according to embodiments.

FIG. 3 shows a comparator $15_i$ with a programmable threshold which perform the BEMF zero-crossing detection. The comparison threshold in the comparator $14i$ may be in principle set to a theoretical value of the half of a DC bus voltage $V_{DC}$, $V_{DC}/2$, for each motor phase, but in practice the correct comparison threshold may be different from such theoretical value and different for each motor phase i.

A main controller 12, which is a processing arrangements, which can be embodied by one or more processing units or circuitry, such as microprocessors, microcontroller or DSP, or also by a distributed processing arrangement, is configured to program a corresponding comparison threshold $ZT_i$ for each comparator $15_i$. Each comparator $15_i$ is started by a respective trigger signal $TR_i$ (e.g. a pulse signal) and, if the corresponding back EMF signal $BEMF'_i$ (or $BEMF_i$ without conditioning) crosses the comparison threshold $ZT_i$, decreasing or increasing, it generates a detection signal, i.e. zero crossing signal, $ZC_i$ (e.g. a pulse signal). Optionally, the zero crossing signal can be generated only on one type of crossing, i.e. decreasing or increasing.

The main controller 12 comprises the position logic module 121, the PWM logic 123 and the trigger logic 122 modules. The position logic module 121 is configured to calculate the current rotor position θ based on the zero crossing values $ZC_1$, $ZC_2$, $ZC_3$. In particular, the current rotor position θ of the motor 11 is determined based upon the last measured electrical period and a time location of last detected zero crossing. The time location is given by the instant at which the pulse in the zero-crossing signal, $ZC_i$, is received. The PWM logic 123 is configured to calculate duty cycles of the three PWM signals $PWM_1$, $PWM_2$, $PWM_3$ which are sent to the three-phase inverter 13 based on the current rotor position θ received by the position logic 121. The trigger logic 122 is configured to generate the trigger signal TRi for each comparator 151i based on the duty cycles of the three PWM signals going to the three-phase inverter.

Thus, based on the above the modules 121, 122, 123, the inverter 13, and comparators $14_1$, $14_2$, $14_3$ are parts of a measurement loop which updates the current rotor position θ outputted by the module 121 with each back EMF new zero crossing time detected at the comparators $14_1$, $14_2$, $14_3$ under the control of module 122.

The microprocessor 12 is configured in general to perform the control of the BLDC motor 11, controlling the rotational speed and/or torque of said BLDC motor 11 on the basis of a position of the rotor θ of the motor. In the embodiment shown the specific way the control on the basis of the current position of the rotor θ is not shown, as several control methods are known which makes use of the position of the rotor, such as Sinusoidal control (using rotor position and voltage amplitude proportional to speed or torque) or FOC (measuring also the motor phase currents with Clarke Park transformation). Such control of the rotational speed and/or torque of said BLDC motor 11 on the basis of a position of the rotor θ may performed at the PWM module 123 or in another logic or software module of the controller 12. Optionally an offset can be added to the position of the rotor θ to maximize control efficiency, e.g. to maximize the produced torque. For instance a sinusoidal control with a speed control may be implemented in a microcontroller.

Figure 4:
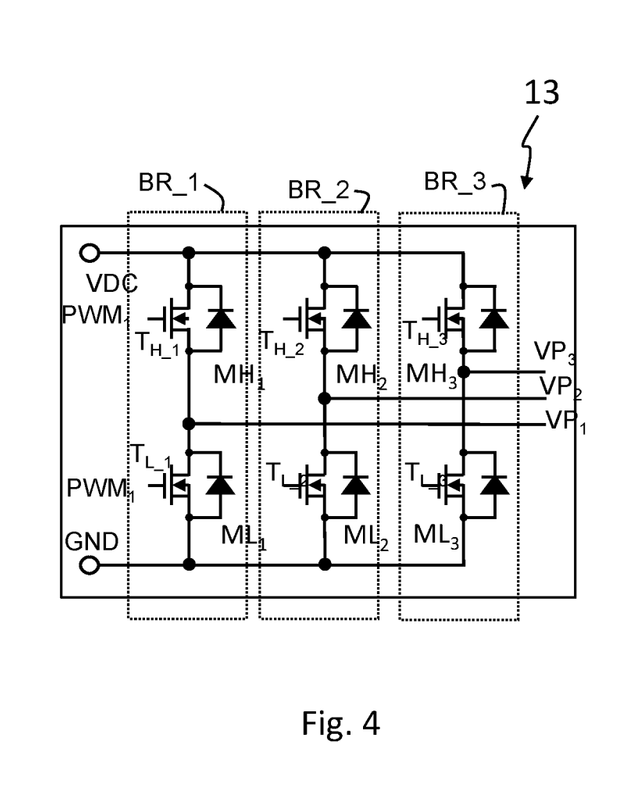
FIG. 4 represents schematically a third sub-circuit of the control circuit according to embodiments.

FIG. 4 shows the structure of a three-phase inverter, which it is known per se and comprises three arms BRi, as full bridges, each for one phase VPi, with a respective high side transistor TH_i and low side transistor TL_i.

Figure 5:
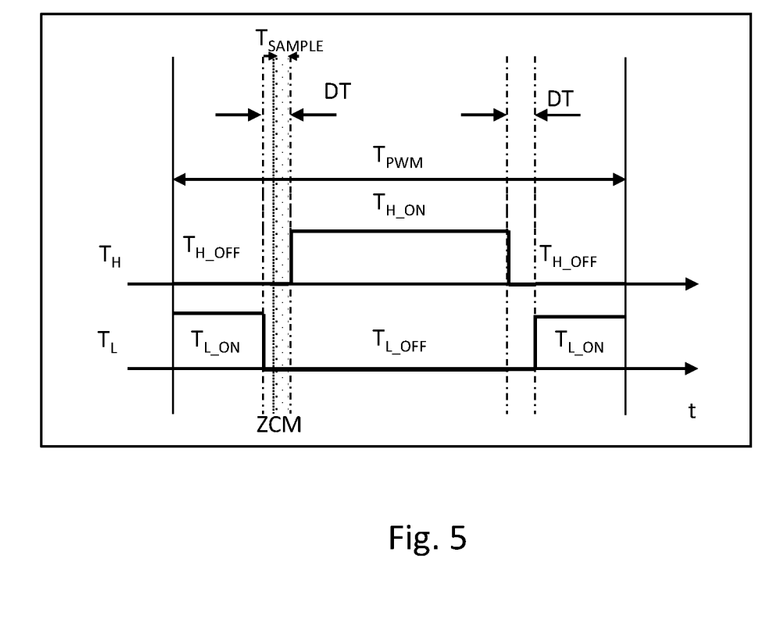
FIG. 5 is a time diagram representing signals of the control circuit according to embodiments.

FIG. 5 shows an example of the signals which drive the two switches in each i-th arm BRi, the high side transistor TH_i and low side transistor TL_i, of the three-phase inverter 13. Considering that practical power switches require or rely on a finite time to change states, to prevent a short circuit developing across voltage supply $V_{DC}$ and ground GND, it is always necessary or desirable on each inverter arm $BR_i$ to delay the turn-on of the closing switch to wait the effective turn-off of the opening switch. This delay is usually termed dead-time, DT. For each phase, the total PWM period of the PWM signal $PWM_i$ is always $T_{PWM}=T_{H\_ON}+2*T_{H\_OFF}=T_{L\_OFF}+2*T_{L\_ON}$ and $T_{H\_OFF}=T_{L\_ON}+DT$. As result, during the dead-time DT, the phase of the motor 11 is floating for a brief time, in particular between the effective turn-off of the opening switch, among the high side transistor TH_i and low side transistor TL_i in the arm $BR_i$, and the actual turn-on of the closing switch, and during this brief time the back electromotive force can be measured by the comparator 15i to detect its zero crossing. The duty cycle DC, as known, is the duty cycle of the PWM signal $PWM_i$ from which the two complementary signals with deadtime DT for the high side transistor TH_i and low side transistor TL_i are obtained.

The trigger logic 122 is configured to generate the corresponding trigger signal $TR_i$, e.g. a pulse signal, which activates the comparison in the comparator $15_i$, for each comparator $15_i$ as $T_{H\_OFF}-T_{SAMPLE}=T_{L\_ON}+DT-T_{SAMPLE}$ or $T_{PWM}-T_{H\_OFF}+DT-T_{SAMPLE}=T_{PWM}-T_{L\_ON}-T_{SAMPLE}$ where $T_{SAMPLE}<DT$ and it is the back electromotive force sampling time of the comparator $15_i$, i.e. the sampling time which it takes to start the measurement of one BEMF value (e.g. ADC sampling time) and the measure is part of the comparator, then the zero-crossing time detection, i.e. detection of instant $ZC_i$, occurs if the BEMF measured value crosses the threshold of the comparator $15_i$. Thus, the comparator 15i is activated at a time which depends on its sampling time $T_{SAMPLE}$ and the PWM signal parameters, i.e., period $T_{PWM}$, dead-time DT and duty cycle (which depends on off and on time choices for the high side transistor TH_i and low side transistor TL_i).

Thus the comparator $15_i$ is activated at a time, defined by the pulse signal in the trigger signal $TR_i$ calculated on the basis of the values of period TPWM, duty cycle DC and dead time DT of the respective PWM phase and of a back electromotive force measurement time $T_{SAMPLE}$, to perform zero-crossing detection, which is mainly a sampling time of the signal $BEMF'_i$, (or $BEMF_i$), e.g. a back electromotive force sampling time $T_{SAMPLE}$, which is lower than said dead-time. The back electromotive force sampling time $T_{SAMPLE}$ may then in embodiments comprise, considering a comparator comprising an ADC (analog to digital converter), the ADC sampling time, the ADC quantization time and the comparison time. The zero-crossing measurement $ZC_i$ is issued during the dead-time DT interval and it overlaps the dead-time DT at least for a time equal to the back electromotive force sampling time $T_{SAMPLE}$, in particular ADC sampling time.

In FIG. 5 it is shown a back electromotive force sampling time $T_{SAMPLE}$ and the start of the zero-crossing measurement ZCM.

Finally, the selection of the comparator $15_i$ is still based on the duty cycles of the three PWM signals going to the three-phase inverter, e.g. the trigger logic 122 generates the trigger signal for the comparator of the phase to which is applied for instance the maximum duty cycle. In variant embodiments, medium or minimum duty cycle can be used.

Thus, the advantages of the solution provided in one or more embodiments described hereabove are clear.

The proposed solution allows to detect the back-EMF zero crossing for sinusoidal commutation without the need to open a dedicated time window, i.e. without the need to stop driving of a motor phase, and it reduces the computational load, the torque ripple and the electric noise. Moreover, the proposed solution can be used also as low-cost redundant measure in safety critical motor control applications.

Of course, without prejudice to the principle of the invention, the details of construction and the embodiments may vary widely with respect to what has been described and illustrated herein purely by way of example, without thereby departing from the scope of the present disclosure.

What is claimed is:

1. A method, comprising:
controlling at least one of a rotational speed or position of a brushless DC (BLDC) motor based on a position of a rotor of the BLDC motor, the BLDC motor being driven with three driving phases supplied to three-phase driving terminals by a three-phase inverter having three arms, each of the arms respectively including a high side switch and a low side switch, the BLDC motor configured to operate with a sinusoidal commutation, the controlling the at least one of the rotational speed or the position of the BLDC motor including calculating a current position of the rotor based on zero-crossing times of back electromotive forces, by:
generating a respective pulse width modulation (PWM) signal for each of three PWM phases, each of the PWM signals including a respective pair of complementary signals with dead-time and having a duty cycle based on the current position of the rotor;
supplying each pair of complementary signals with dead-time to a respective high side switch and low side switch of the three-phase inverter;
sensing back electromotive forces at the three-phase driving terminals of the BLDC motor and obtaining corresponding signals indicating zero-crossing times by performing a zero-crossing time measurement on each of the back electromotive forces and obtaining corresponding signals indicating the zero-crossing times;
generating trigger signals, which activate the performing the zero-crossing time measurement on each of said back electromotive forces; and
identifying the occurrence of a time interval corresponding to a dead time in the respective PWM phase, wherein the zero-crossing time measurement is performed during the occurrence of the dead-time.

2. The method according to claim 1, wherein the identifying the occurrence of a time interval corresponding to the dead time in the respective PWM phase comprises calculating the time interval corresponding to the dead time based on current values of period, duty cycle and dead time in the respective PWM phase, and
the generating trigger signals, which activate the performing the zero-crossing time measurement is based on a zero-crossing measurement time to perform a measurement of a back electromotive force value, the zero-crossing measurement time being lower than the dead-time.

3. The method according to claim 2, wherein the zero-crossing measurement time includes at least a sampling time of the back electromotive force.

4. The method according to claim 1, wherein the zero-crossing time measurement comprises comparing the back electromotive forces with respective programmable thresholds signaling as zero-crossing time values, and issuing a pulse signal in response to one of the back electromotive forces crossing a respective threshold.

5. The method according to claim 1, wherein the trigger signal for a respective phase is equal to at least one of:
an off time of the complementary signal supplied to the high side switch minus a back-electromotive force sampling time,
an on time of the complementary signal supplied to the low side switch plus the dead-time minus the back-electromotive force sampling time,
a PWM period minus the off time of the complementary signal supplied to the high side switch plus the dead-time minus the back-electromotive force sampling time, or
the PWM period minus the on time of the complementary signal supplied to the low side switch minus the back-electromotive force sampling time.

6. The method according to claim 1, wherein the sensing back-electromotive forces at the three-phase driving terminals of the BLDC motor comprises at least one of conditioning the back-electromotive forces in a given voltage range or filtering the back-electromotive forces to remove overlapped noise.

7. The method according to claim 1, wherein the calculating the current position of the rotor based on zero-crossing times of back electromotive forces comprises determining the current position of the rotor based on a last measured electrical period and a time location of a last detected zero crossing.

8. The method according to claim 7, wherein the zero-crossing time measurement comprises comparing the back electromotive forces with respective programmable thresholds signaling as zero-crossing time values, and issuing a pulse signal in response to one of the back electromotive forces crossing a respective threshold, and the time location of the last detected zero crossing is indicated by the pulse signal.

9. A control circuit of a brushless DC (BLDC) motor, configured to control the BLDC motor based on a position of a rotor of the BLDC motor, the BLDC motor being driven with three driving phases supplied to three-phase driving terminals by a three-phase inverter having three arms, each of the arms respectively including a high side switch and a low side switch, the BLDC motor configured to operate with a sinusoidal commutation, the control circuit comprising:
processing circuitry configured to calculate a current position of the rotor based on zero-crossing times of back electromotive forces, the processing circuitry comprising:
PWM generation circuitry configured to generate a PWM signal for each of three PWM phases, each of the PWM signals including a respective pair of complementary signals with dead-time and having a duty cycle based on a current position of the rotor, and to drive the three-phase inverter by supplying each pair of complementary signals with dead-time to a respective high side switch and low side switch;
measurement circuitry configured to generate corresponding signals indicating zero-crossing times by performing a zero-crossing time measurement on each of the back electromotive forces sensed at the three-phase driving terminals of the BLDC motor, the current position of the rotor being calculated based on the zero-crossing times of the back electromotive forces; and trigger circuitry configured to generate trigger signals based on the occurrence of a time interval corresponding to the dead-time in the respective PWM phase, which activate the measurement circuitry to perform the zero-crossing time measurement on each of the back electromotive forces, wherein the zero-crossing time measurement is performed during the occurrence of the dead-time.

10. The control circuit of the BLDC motor according to claim 9, wherein the trigger circuitry is configured to generate the trigger signals based on current values of period, duty cycle, and dead time in the respective PWM phase, and based on a zero-crossing measurement time to perform a measurement of a back electromotive force value, the zero-crossing measurement time being lower than the dead-time.

11. The control circuit of the BLDC motor according to claim 10, wherein the zero-crossing measurement time includes at least a sampling time of the back electromotive force.

12. The control circuit of the BLDC motor according to claim 9, wherein the measurement circuitry comprises comparator circuits configured to compare the back electromotive forces with respective programmable thresholds signaling as zero-crossing time values, and issue a pulse signal in response to one of the back electromotive forces crossing a respective threshold.

13. The control circuit of the BLDC motor according to claim 12, wherein the trigger signal for a respective phase is equal to at least one of:

an off time of the complementary signal supplied to the high side switch minus a back-electromotive force sampling time, an on time of the complementary signal supplied to the low side switch plus the dead-time minus the back-electromotive force sampling time, a PWM period minus the off time of the complementary signal supplied to the high side switch plus the dead-time minus the back-electromotive force sampling time, or the PWM period minus the on time of the complementary signal supplied to low switch minus the back-electromotive force sampling time.

14. The control circuit of the BLDC motor according to claim 9, further comprising conditioning circuits configured to condition the back-electromotive forces in a given voltage range.

15. The control circuit of the BLDC motor according to claim 9, further comprising conditioning circuits configured to filter the back-electromotive forces to remove overlapped noise.

16. The control circuit of the BLDC motor according to claim 9, wherein the processing circuitry is configured to determine the current position of the rotor based on a last measured electrical period and a time location of a last detected zero crossing.

17. The control circuit of the BLDC motor according to claim 9, wherein the processing circuitry is configured to determine the current position of the rotor based on a pulse signal issued by the measurement circuitry.

18. A device, comprising:
a brushless DC (BLDC) motor configured to be driven with three driving phases supplied to three-phase driving terminals by a three-phase inverter having three arms, each of the arms respectively including a high side switch and a low side switch, the BLDC motor configured to operate with a sinusoidal commutation; and a control circuit configured to:
control the BLDC motor based on a position of a rotor of the BLDC motor;
calculate a current position of the rotor based on zero-crossing times of back electromotive forces;
generate a PWM signal for each of three PWM phases, each of the PWM signals including a respective pair of complementary signals with dead-time and having a duty cycle based on a current position of the rotor, and to drive the three-phase inverter by supplying each pair of complementary signals with dead-time to a respective high side switch and low side switch;
generate corresponding signals indicating zero-crossing times by performing a zero-crossing time measurement on each of the back electromotive forces sensed at the three-phase driving terminals of the BLDC motor the current position of the rotor being calculated based on the zero-crossing times of the back electromotive forces; and
generate trigger signals based on the occurrence of a time interval corresponding to the dead-time in the respective PWM phase, which activate the control circuit to perform the zero-crossing time measurement on each of the back electromotive forces, wherein the zero-crossing time measurement is performed during the occurrence of the dead-time.

19. The device according to claim 18, wherein the control circuit is configured to generate the trigger signals based on current values of period, duty cycle, and dead time in the respective PWM phase, and based on a zero-crossing measurement time to perform a measurement of a back electromotive force value, the zero-crossing measurement time being lower than the dead-time.

20. The device according to claim 19, wherein the zero-crossing measurement time includes at least a sampling time of the back electromotive force.

* * * * *